United States Patent [19]

Cox, Jr.

[11] Patent Number: 4,899,409
[45] Date of Patent: Feb. 13, 1990

[54] MANUAL TOOL FOR PREPARING TUBE ENDS FOR JOINTURE

[76] Inventor: David W. Cox, Jr., 601 Four Mile Road, Apt. 308, Alexandria, Va. 22305

[21] Appl. No.: 351,748

[22] Filed: May 15, 1989

[51] Int. Cl.⁴ .............................................. B25F 1/00
[52] U.S. Cl. ......................................... 7/167; 7/100; 7/157; 15/104.04; 15/104.05; 15/111; 228/57
[58] Field of Search .................. 7/100, 157, 170, 167; 15/104.04, 104.05, 104.03, 111; 228/57

[56] References Cited

U.S. PATENT DOCUMENTS

| | | | |
|---|---|---|---|
| 810,987 | 1/1906 | Spicer | 7/167 |
| 1,620,262 | 3/1927 | Klaboe | 7/167 |
| 2,562,136 | 7/1951 | Sullins | 7/100 |
| 4,038,715 | 8/1977 | Litt | 15/104.03 |
| 4,133,070 | 1/1979 | Litt | 15/106 |
| 4,553,280 | 11/1985 | Stright | 7/157 |
| 4,575,892 | 3/1986 | Ross | 15/106 |

FOREIGN PATENT DOCUMENTS 637208  5/1950  United Kingdom ................. 15/111

Primary Examiner—Roscoe V. Parker
Attorney, Agent, or Firm—Armstrong, Nikaido, Marmelstein, Kubovcik & Murray

[57] ABSTRACT

A manual tool for preparing tube ends and/or pipe ends for jointure is provided, to perform the functions of scraping for cleaning, scarifying, deburring and abrading to remove grit and foreign matter such as solder, solder drops, chemical substances, or other debris on the outer and/or inner surfaces of the ends of tubing, pipe fittings and the like, prior to connection of said tubing, pipe and fittings by welding, soldering, etc. A plurality of tool units are detachably connected to a manual tool comprising a tool body adapted to fit readily and confortably in the hand of a user, said tool body having a generally circular shape. The tool units may comprise: external brush units, internal brush units, external sharpened blade units, internal metal blades or ribs having sharpened edges and the like or other desirable tool units having sharpened edges, abrasive surfaces, and the like to perform the desired cleaning, scarifying, scraping, etc. necessary to provide cleaned tubing ends, piping ends, and the like to allow better connection of said tubing ends, piping ends, etc.

4 Claims, 1 Drawing Sheet

4,899,409

MANUAL TOOL FOR PREPARING TUBE ENDS FOR JOINTURE

This invention relates to a tool for preparing tube ends for jointure by welding, soldering brazing and the like. The tool involves and performs the operations of scraping for cleaning, scarifying, deburring, and abrading to remove grit and foreign matter such as drops of solder, chemical substances, or other debris on the outer and inner surfaces of the tubing ends, which may be left from prior connections or other uses of tubing ends.

In the construction industry, plumbers and pipefitters are called upon to prepare tube endings, pipes, and fittings for connection, and to make the assigned tube and pipe connections for large structures as short a time as possible in a concentrated effort to complete the structure in as short a time as possible. The volume of connections to be made can be very numerous, and accordingly, anything that can be done to speed up this work without affecting or detracting from the quality of the connected joint is a valuable contribution to the industry and highly useful for plumbers and steamfitters.

SUMMARY OF THE INVENTION

A purpose of this invention is to provide a tool for preparing tubular ends for connection that will contribute to the efficiency of the task of making tubing and piping connections and at the same time ease the burden of the plumbers and pipefitters work.

Another object of the present invention is to provide a tool for preparing ends of tubing, pipes, and fittings for connection that is designed for easy use and is capable of being readily changed in size, as well as the type of the tools it provides, so that is of greater value and readiness to the using artisan.

A further object of the present invention is to provide a tool for preparing tubular ends, pipe ends, and fittings for connection with is especially designed to fit for the user's hand with rounded design, rounded lateral gripping edges and rounded main gripping areas to ease the gripping effort required by the user. The tool size has also been designed for maximum leverage for the type of tool load involved.

The term pipe or tubing as used in the description of the present invention is intended to mean all commercial forms of pipe or tubing including copper, aluminum, steel, or other metal as well as plastic materials such as polyvinyl chloride pipe now becoming widely used. The present invention may also be used for materials other than pipe or tubing. For example, the present invention may be used for cleaning of battery terminals, cables and the like, and could be very advantageously used for this application.

BRIEF DESCRIPTION OF THE DRAWINGS

This invention is shown in its physical form including the various parts and alternate parts, a preferred embodiment of which will be described in detail in this specification and illustrated in the accompanying drawings which form a part of this invention, and wherein.

DESCRIPTION OF PREFERRED EMBODIMENTS

Figure 1:
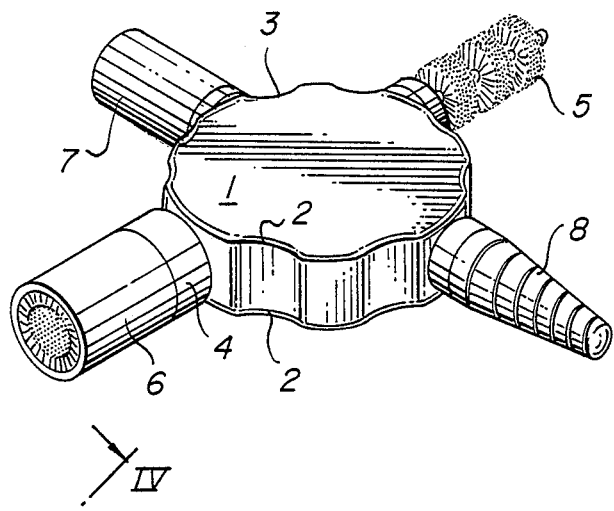
FIG. 1 is a view in perspective of a tool embodying the present invention.
Figure 5:
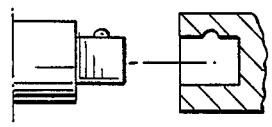

Referring now to the drawings wherein the tool and its parts are illustrated to show preferred embodiments of the present invention only and not for purposes of limiting the scope of this invention, FIG. 1 shows a tool having a main body 1, in a rounded shape and having rounded lateral edge portions 2 and easy to grip rounded recesses 3 in the outer periphery of the main body 1. A suitable size for the main body would be convenient for hands of most humans, and would thus have a diameter of about three or four inches. For adequate strength, the diameter of the arm portions 4 may be one-eighth, one-quarter, one-half, three-quarters or even one full inch. The main body of the tool is made of a suitable metal, preferably a hard steel which has great strength and is resilient to shock (rather than brittle) to give it long wearing properties. It may be that synthetic plastics may be available or may be developed to have sufficiently strong and tough properties to serve as this main body.

At least one, and preferably three or four arm portions 4 extend radially outwardly from the main body but are integral therewith, preferably at equally spaced points around the periphery of the main body 1. These arm portions may be bored and internally threaded to threadably receive any of several different tool portions such as in indicated generally by the numerals 5, 6, 7 and 8 in FIG. 2, which have external threads 9 on their base so as to be detachably but securely fastened to the arm portions 4 of the main body 1. While the drawings show a threaded connection of the arm portions 4 and the spindle 9, it is believed preferable that the tools join the arm portions by a snap-on joint type of connection, and the spindles 9 may be square or hexagonal or the like. In this case, changing of the tools may be accomplished easily and swiftly. As previously described, the spindle size should be selected to match the size of the arm portion and designed to be adequate for the required strength to do the job and to handle without undue breakage the stresses encountered.

Figure 2:
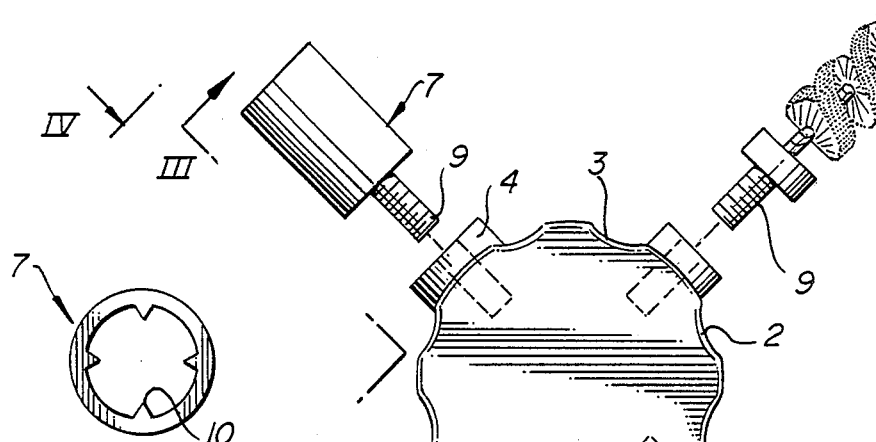
FIG. 2 is a top elevational view of the tool shown in FIG. 1.
Figure 4:
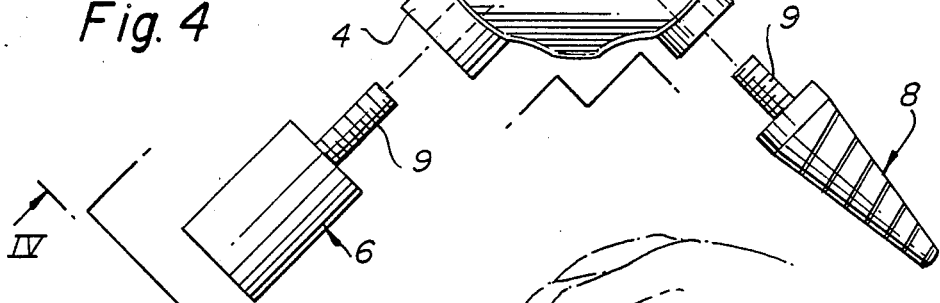
FIG. 4 is an end elevational view of a portion of the tool taken in the direction of line IV—IV of FIG. 2.
Figure 3:
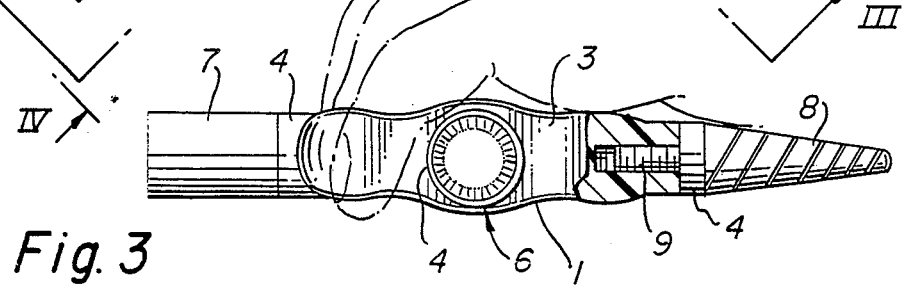
FIG. 3 is an end elevational view of a portion of the tool taken in the direction of line III—III of FIG. 2 to illustrate further details of the tool construction and arrangement.

The tool illustrated in FIG. 2 are as follows:

A. Tool 5 comprises a spiral wound pair of wires with metal bristles held between the pair of wires to form a spiral brush, appropriate for preparing, cleaning and scarifying internal ends of tubing, pipes, and fittings, and the like.

B. Tool 6 comprises a hollow cylindrical portion with a spiral brush inserted and fixed to the inside periphery of the cylindrical portion so that the external surfaces of tubular ends. Ends of pipes and fittings can be prepared, cleansed, and scarified for use. It has also been considered that the Tool 6, could be made in another manner than with wire or animal bristles. For example, an effective tool could be made by a pair of spaced flexible films, each of which has a coating of an effective material of hard, gritty or abrasive materials which can remove dirt, etc. and can scarify tubing or pipe end by friction. A tubing end can be inserted between the two films and cleaned by frictional contact with the gritty abrasive surface.

C. Tool 7 comprises a cylindrical hollow shaped body with a plurality of sharpened, hardened, metal ribs or blades 10 for scraping the external periphery of tubing and pipe ends. The sharpened ribs or blades may be of any design, such as tilted to one side for use with one-way rotation. These may be one, two, three or more ribs or blades dispersed in a helical path around the periphery of the interior of the Tool 6 and extending axially therealong.

D. Tool 8 comprises a hardened metal blade with sharpened edges formed into the shape of a reamer or an auger, and preferably with a conical taper of decreasing diameter towards the free end. This permits its use in preparing cleaning and scarifying internal surfaces of tubing ends, pipe ends, and fittings, such as, for removing undesired metal such as solder, solder drops, and the like. It may also be useful in enlarging the internal diameter of a pipe or tubing, especially in the case of working with sheet metal, etc.

Obviously, each of the Tools 5, 6, 7, and 8 can be cylindrically shaped or appropriately tapered. This allows its use with objects of different size without requiring a change in the particular size of tool. On the other hand, Tools 5, 6, 7, and 8 are all detachable tools and can be interchanged for another like but more appropriately sized tool. It's considered that Tools 7 and 8 are a new concept in this type of tool and have not heretofore been available to pipefitters and plumbers for use in preparing pipe ends and tubing ends for assembly as described in this present invention.

Further, tools embodying the present invention may be furnished with several sets of tools of different sizes. Additionally, the tool unit on attachments furnished with the tool may be of an entirely different configuration. However, the present tool attachments have been selected with the knowledge of experienced pipefitters and plumbers as to what tool attachments are the most useful in the normal exposure encountered in the construction industry.

The U.S. patent Litt, U.S. Pat. No. 4,133,070, issued Jan. 9, 1979, shows a Scarifying Tool for Pipe Ends. A device similar to this device has been on the market.

I have the belief that my experience as a pipefitter has given me a lot of practical experience. In a number of cases, the tubing or piping ends have been used before. Thus such fittings may well have a layer of solder on their end portions either on their external or their internal peripheral surfaces. In some instances, a natural or wire brush tool, as shown in conjunction with tools numbered 5 and 6, could very well be able and adequate to provide a clear between the outside and inside peripheries of the tubing or pipe ends encountered in the construction of buildings as they are done today. If the solder layer encountered cannot be cleaned or scarified by the brush Tools 5 and 6, such solder layers can certainly be scraped away or scarified by the Tools 7 or 8 of the present invention.

What is claimed is:

1. A manual tool for preparing, cleaning and scarifying ends of tubing or pipefittings for jointure by soldering, welding, brazing, and the like, which comprises:
    (a) a tool body adapted to fit readily and comfortably in the hand of a user and having a generally circular shape;
    (b) at least three arm members projecting radially outwardly from said body in generally equally spaced relationship;
    (c) each of said arm members including a tool unit for performing a predetermined operation on a tubing end externally or internally thereon, said tool units being securely fastenable to the main body but detachably connected thereto.

2. A manual tool as claimed in claim 1, wherein said tool units may include:
    (a) a unit having external elements on its outer periphery to primarily prepare, clean, and scarify inside surfaces of tubular ends, pipes and fittings;
    (b) a unit having internal brush elements to primarily prepare, clean, and scarify external surfaces of tubular ends, pipes, and fittings;
    (c) a unit having tapered exterior sharpened surfaces to contact, clean and scarify inside surfaces of tubular and piping ends; and
    (d) a unit having interior sharpened surfaces to contact, clean and scarify exterior surfaces of tubular and piping ends.

3. A manual tool as claimed in claim 2, wherein tool units of different sizes and other configurations are available for use with said tool.

4. A manual tool as claimed in claim 1, wherein the tool units are connected to the arm portions by a snap-on joint.

* * * * *